UNITED STATES PATENT OFFICE 1,970,732

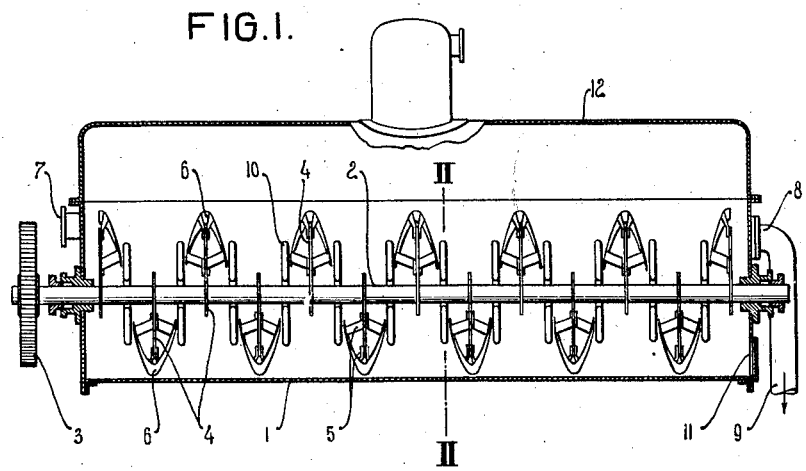
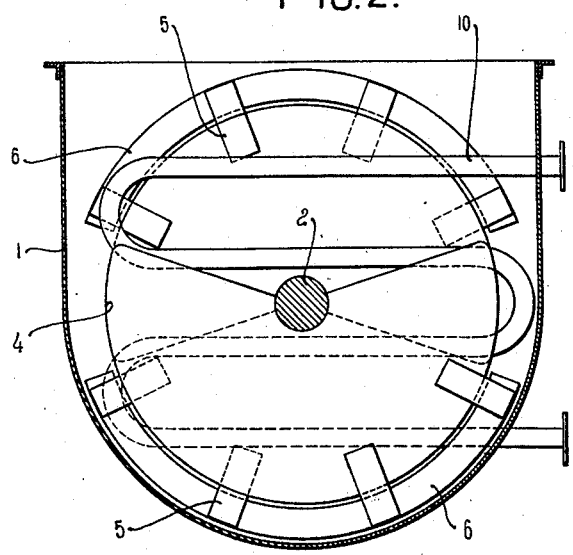

APPARATUS FOR CRYSTALLIZING SOLUTIONS BY EVAPORATION OR COOLING

Richard Bonath, Bussum, Netherlands, assignor to Werkspoor N. V., Amsterdam, Netherlands, a company of the Netherlands Application February 19, 1932, Serial No. 594,131
In the Netherlands January 8, 1932

3 Claims. (Cl. 159—45)

This invention relates to apparatus for crystallizing solutions by evaporating or cooling, more especially, although not exclusively, for cooling cooked sugar masses, or for concentrating sugar juices and syrups.

In a prior specification I have already described apparatus comprising a trough-like receptacle and a rotary, hollow shaft therein, said shaft having secured thereto, in addition to a conveyor screw blade, a series of sector-shaped, hollow disks mounted at right angles to the axis of the shaft and extending through angular distances exceeding 180°. Moreover, said apparatus is provided with means for circulating a cooling fluid through the disks, this fluid being supplied and discharged through the hollow shaft. As already suggested in said earlier specification, the trough could also be provided with an air-tight cover, when it may be used as a vacuum pan for cooking thick juice and syrups.

I have now found that it is not necessary for the sector-shaped disks to be hollow and that very uniform crystallization can be secured when the disks are formed as solid plates and the trough is provided with separate cooling or heating elements. This is probably due to the fact that the solid, substantially semi-circular disks, which are mounted in juxtaposition on the rotary shaft so that successive disks fill up at least alternate halves of the trough section, force the mass under treatment during its travel through the trough to regularly flow along the cooling elements, thereby preventing the various portions of the mass from mixing, and, as a consequence, promoting a uniform growth of the crystals.

The invention therefore resides therein that the revolving shaft carries a series of solid plates so formed and arranged that successive plates fill up at least alternate halves of the trough section, the trough being preferably also provided with cooling or heating means. The provision of a revolving shaft with plates as specified enables the apparatus to operate continuously, so that the mass to be treated is continuously supplied at one end of the apparatus and, after completing its travel through the trough, discharged at the other end. During said travel, the plates or disks on the shaft prevent successive portions of the liquid, i. e. portions in different stages of the progressive cooling or heating, from mixing, so that all crystals follow substantially the same path and move from inlet to outlet in the same succession wherein they are supplied into, or formed within the trough. As a consequence, all crystals are subjected to the same heat treatment.

The use of solid disks or plates and of separate cooling or heating elements in lieu of hollow disks offers the advantage that the apparatus is cheaper to manufacture. Besides, it enables existing cooling troughs provided with cooling elements to be adapted for continuous operation, to which end it suffices to secure the above sector-shaped plates on the shaft.

The drawing illustrates more or less diagrammatically an embodiment of the invention, Fig. 1 being a longitudinal sectional elevation of a cooling trough, whereas Fig. 2 is a section, on an enlarged scale, along the line II—II in Fig. 1.

Rotatably mounted within a trough 1 is a horizontal shaft 2, one end of which projects from the front face of the trough and carries a worm wheel 3, through which the shaft can be driven in any convenient manner. Secured to the shaft 2 are a series of sector-shaped plates 4 to which are connected, through angles 5, sections 6 of a conveying screw blade. Alternate plates 4 are arranged in juxtaposition, it being understood that all plates are mounted at right angles to the axis of the shaft and extend through angular distances of substantially 200°, as clearly illustrated in Fig. 2. The cooked sugar mass is supplied through a pipe 7 near the front end of the trough and is discharged by an overflow 8 and a pipe 9 at the rear end thereof. Intermediate between successive plates 4 are stationary cooling coils 10 each connected to a supply pipe for the cooling water, and to a discharge pipe, not shown.

As already stated, the provision of the sector-shaped plates on shaft 2 enables the operation to be continuous, so that the cooled mass discharged by pipe 9 may be fed in a continuous stream to the centrifugal machines. The travel of the mass through the trough is promoted by the screw blade sections 6, but it will be understood that the mass could as well be caused to flow under the influence of gravity only.

In order that the trough may be emptied at the end of the cooling process and after the level of the cooked mass has fallen below the overflow 8, a slide valve 11 is provided in the rear face of the trough and near the bottom thereof.

It will be understood that the cooling elements 10 could also be arranged for rotation with the shaft 2.

By the provision of an air-tight cover 12 on the trough I can adapt the apparatus as a vacuum pan for cooking thick juices and syrups.

What I claim is:—

1. Apparatus for crystallizing solutions by evaporation or cooling comprising a trough-like receptacle having a shaft revolubly mounted therein, and a series of flat solid plates secured at substantially right angles to said shaft having an angular length exceeding 180°, said plates being so formed and arranged in staggered relation so that successive plates fill up at least alternate halves of the trough section.

2. Apparatus in accordance with claim 1, in which the trough is provided with heat exchanging means.

3. Apparatus in accordance with claim 1, in which the trough has an air-tight closure so as to be adapted as a vacuum pan.

RICHARD BONATH.